(12) United States Patent
Dean et al.

(10) Patent No.: US 11,858,464 B2
(45) Date of Patent: Jan. 2, 2024

(54) CARGO MANAGEMENT SYSTEM FOR VEHICLE

(71) Applicant: Ford Global Technologies, LLC, Dearborn, MI (US)

(72) Inventors: William Henry Dean, Plymouth, MI (US); George David Aucott, Novi, MI (US); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 17/500,284

(22) Filed: Oct. 13, 2021

(65) Prior Publication Data
US 2023/0114816 A1    Apr. 13, 2023

(51) Int. Cl.
  *B60R 7/02*  (2006.01)
  *B60R 5/04*  (2006.01)
(52) U.S. Cl.
  CPC . *B60R 7/02* (2013.01); *B60R 5/04* (2013.01)
(58) Field of Classification Search
  CPC .................................. B60R 7/02; B60R 5/04
  USPC ........................................................ 296/24.3
  See application file for complete search history.

(56) References Cited

U.S. PATENT DOCUMENTS

| | | | | |
|---|---|---|---|---|
| 2,889,097 | A * | 6/1959 | Broehl | B62D 47/003 296/37.16 |
| 3,291,520 | A * | 12/1966 | Smith | B60J 5/103 296/37.16 |
| 7,401,716 | B2 | 7/2008 | Svenson et al. | |
| 7,713,008 | B2 | 5/2010 | Kanczuzewski et al. | |
| 8,256,815 | B2 * | 9/2012 | Tosco | B60R 5/04 296/37.16 |
| 10,011,233 | B2 | 7/2018 | Huebner et al. | |
| 10,059,269 | B2 * | 8/2018 | Herman | B60R 13/0237 |
| 2016/0129949 | A1 | 5/2016 | Marable et al. | |

FOREIGN PATENT DOCUMENTS

| | | |
|---|---|---|
| DE | 10332181 | 8/2010 |
| DE | 202017001105 U1 * | 7/2018 |
| JP | 2011116190 A * | 6/2011 |

* cited by examiner

*Primary Examiner* — Pinel E Romain
(74) *Attorney, Agent, or Firm* — Burris Law, PLLC

(57) ABSTRACT

A cargo management system for a cargo area of a vehicle includes a first retention feature and a second retention feature. The first retention feature is formed in a first panel structure of the cargo area and adapted to support a first end of a support member. The second retention feature is formed in an opposing second panel structure of the cargo area and adapted to support an opposed second end of the support member. The first and second retention features are configured to inhibit movement of the support member in a longitudinal direction of the vehicle while also allowing the support member to move laterally past one of the first and second retention features into a space defined by a respective panel structure.

20 Claims, 7 Drawing Sheets

CARGO MANAGEMENT SYSTEM FOR VEHICLE

FIELD

The present disclosure relates to a cargo management system for a vehicle, and a vehicle including a cargo management system.

BACKGROUND

The statements in this section merely provide background information related to the present disclosure and may not constitute prior art.

Some commercial vehicles are used for transporting cargo such as flowers, clothes, and/or luggage from one place to another. Owners of these vehicles often modify a cargo area to create extra space for storage and/or delivery of the cargo transported therein. In some examples, owners purchase ready-made kits which can be expensive. In other examples, owners build their own kits using inexpensive materials such as plywood and/or 2×4s. However, these kits are often bolted to the vehicle either permanently or semi-permanently to the walls of the vehicle and/or the floor of the vehicle. Once in place, the kits are difficult to remove or reconfigure especially when the owner is transporting different types of cargo.

These issues related to transporting cargo in vehicles, among other issues related to transporting cargo, are addressed by the present disclosure.

SUMMARY

This section provides a general summary of the disclosure and is not a comprehensive disclosure of its full scope or all of its features.

In one form, the present disclosure provides a cargo management system for a cargo area of a vehicle. The cargo management system comprises a first retention feature and a second retention feature. The first retention feature is formed in a first panel structure of the cargo area and is adapted to support a first end of a support member. The second retention feature is formed in an opposing second panel structure of the cargo area. The second retention feature is adapted to support an opposed second end of the support member. The first and second retention features are configured to inhibit movement of the support member in a longitudinal direction of the vehicle while also allowing the support member to move laterally past one of the first and second retention features into a space defined by a respective panel structure.

In variations of the cargo management system of the above paragraph, which may be implemented individually or in any combination: each of the first and second retention features includes a platform and a lip extending upwardly from a distal end of the platform, the lips inhibit the support member from moving in a lateral direction of the vehicle when the support member is located on the platforms; the platform and the lip of the first retention feature are positioned between an inner panel of the first panel structure and an outer panel of the first panel structure, the platform and the lip of the second retention feature are positioned between an inner panel of the second panel structure and an outer panel of the second panel structure; the lip of the first retention feature is positioned between an inner panel of the first panel structure and an outer panel of the first panel structure, the lip of the second retention feature is positioned between an inner panel of the second panel structure and an outer panel of the second panel structure; the platform and the lip of each of the first and second retention features cooperate to form an L-shape; the platform and the lip of each of the first and second retention features are combined into a unitized part; the platform of the first retention feature extends laterally outwardly from an inner panel of the first panel structure and the platform of the second retention feature extends laterally outwardly from an inner panel of the second panel structure; a third retention feature is formed in the first panel structure and is adapted to support a first end of a cross rod, the third retention feature includes a circular opening having an upper portion and a lower portion, the upper portion has a first diameter that is greater than a second diameter of the lower portion; a fourth retention feature is formed in the second panel structure and is aligned with the third retention feature, the fourth retention feature is adapted to support an opposed second end of the cross rod and includes a circular opening having an upper portion and a lower portion, the upper portion has a third diameter that is greater than a fourth diameter of the lower portion; the third retention feature comprises a flange extending laterally outwardly from a surface defining the circular opening, the fourth retention feature comprises a flange extending laterally outwardly from a surface defining the circular opening of the fourth retention feature; the first retention feature includes a first opening formed in an inner panel of the first panel structure and the second retention feature includes a second opening formed in an inner panel of the second panel structure; a flange extends laterally outwardly from and around a surface defining the first opening, a flange extends laterally outwardly from and around a surface defining the second opening; the first and second openings have a shape that corresponds to a shape of the support beam member; each of the first and second retention features includes a plurality of platforms and a plurality of lips, the platforms are spaced apart from each other, each lip extends upwardly from a distal end of a respective platform; and each of the first and second retention features includes a planar platform and a lip, the planar platform having a slot formed therein, the lip extends upwardly from a distal end of the platform, the lips inhibit the support member from moving in a lateral direction of the vehicle when the support member is located on the platforms.

In another form, the present disclosure provides a cargo management system for a cargo area of a vehicle. The cargo management system comprises a plurality of first retention features and a plurality of second retention features. The first retention features are formed in a first panel structure of the cargo area. The second retention features are formed in an opposing second panel structure of the cargo area and are aligned with respective first retention features. A set of aligned first and second retention features are configured to inhibit movement of a support member in a longitudinal direction of the vehicle while also allowing the support member to move laterally past one of the set of aligned first and second retention features into a space defined by a respective panel structure. Each of the first and second retention features includes a planar platform and a lip extending upwardly from a distal end of the planar platform.

In variations of the cargo management system of the above paragraph, which may be implemented individually or in any combination: the first retention features are longitudinally aligned along the first panel structure and the second retention features are longitudinally aligned along the second panel structure; a third retention feature is formed in the first panel structure and is adapted to support a first end of a cross rod, the third retention feature includes a circular opening having an upper portion and a lower portion, the upper portion has a first diameter that is greater than a second diameter of the lower portion; and a fourth retention feature is formed in the second panel structure and is aligned with the third retention feature, the fourth retention feature is adapted to support an opposed second end of the cross rod and includes a circular opening having an upper portion and a lower portion, the upper portion has a third diameter that is greater than a fourth diameter of the lower portion.

In yet another form, the present disclosure provides a cargo management system for a cargo area of a vehicle. The cargo management system comprises a first panel structure, an opposed second panel structure, a first retention feature, and a second retention feature. The first retention feature is formed in the first panel structure and is adapted to support a first end of a support member. The second retention feature is formed in the opposing second panel structure and is aligned with the first retention feature. The second retention feature is adapted to support an opposed second end of the support member. The first and second retention features are configured to inhibit movement of the support member in a longitudinal direction of the vehicle while also allowing the support member to move laterally past one of the first and second retention features into a space defined by a respective panel structure. Each of the first and second retention features includes a planar platform and a lip extending upwardly from a distal end of the planar platform.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
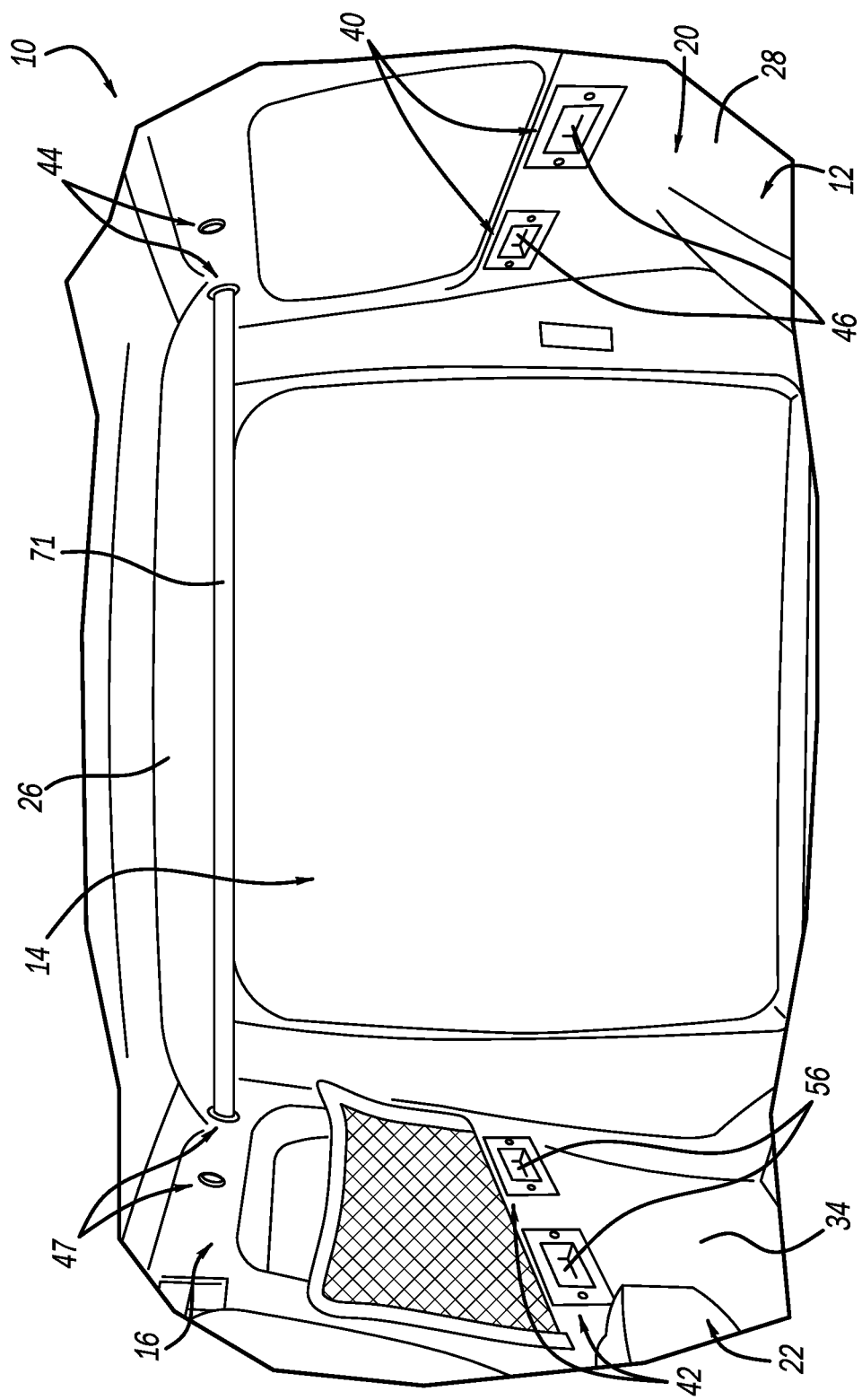
FIG. 1 is a perspective view of a vehicle including a cargo management system including a plurality of retention features according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as a commercial vehicle is illustrated. The vehicle 10 includes a vehicle body 12 and a pair of rear doors (not shown). The vehicle body 12 includes a cargo area 14 at a rear end thereof (i.e., behind an occupancy compartment). The cargo area 14 includes a cargo management system 16 that facilitates the securement and transport of cargo in the cargo area 14. The rear doors are rotatably coupled to the vehicle body 12 between a closed position in which the cargo area 14 is enclosed and an open position in which the vehicle body 12 defines an opening to the cargo area 14. In some forms, the vehicle may be a crossover vehicle, for example, including a single rear door that is rotatably coupled to the vehicle body between open and closed positions.

The cargo area 14 is defined by a first panel structure 20, an opposed second panel structure 22, a floor (not shown), and a vehicle roof 26. The first panel structure 20 is located at a first side of the cargo area 14 (i.e., the first panel structure 20 defines an outer boundary of the cargo area 14 at the first side) and extends from the floor to the vehicle roof 26. The first panel structure 20 includes an inner panel 28 and an outer panel 30 that define a space 32 therebetween. Similarly, the second panel structure 22 is located at a second side of the cargo area 14 (i.e., the second panel structure 22 defines an outer boundary of the cargo area 14 at the second side) and extends from the floor to the vehicle roof 26. The second panel structure 22 includes an inner panel 34 and an outer panel 36 that define a space 38 therebetween.

Figure 2:
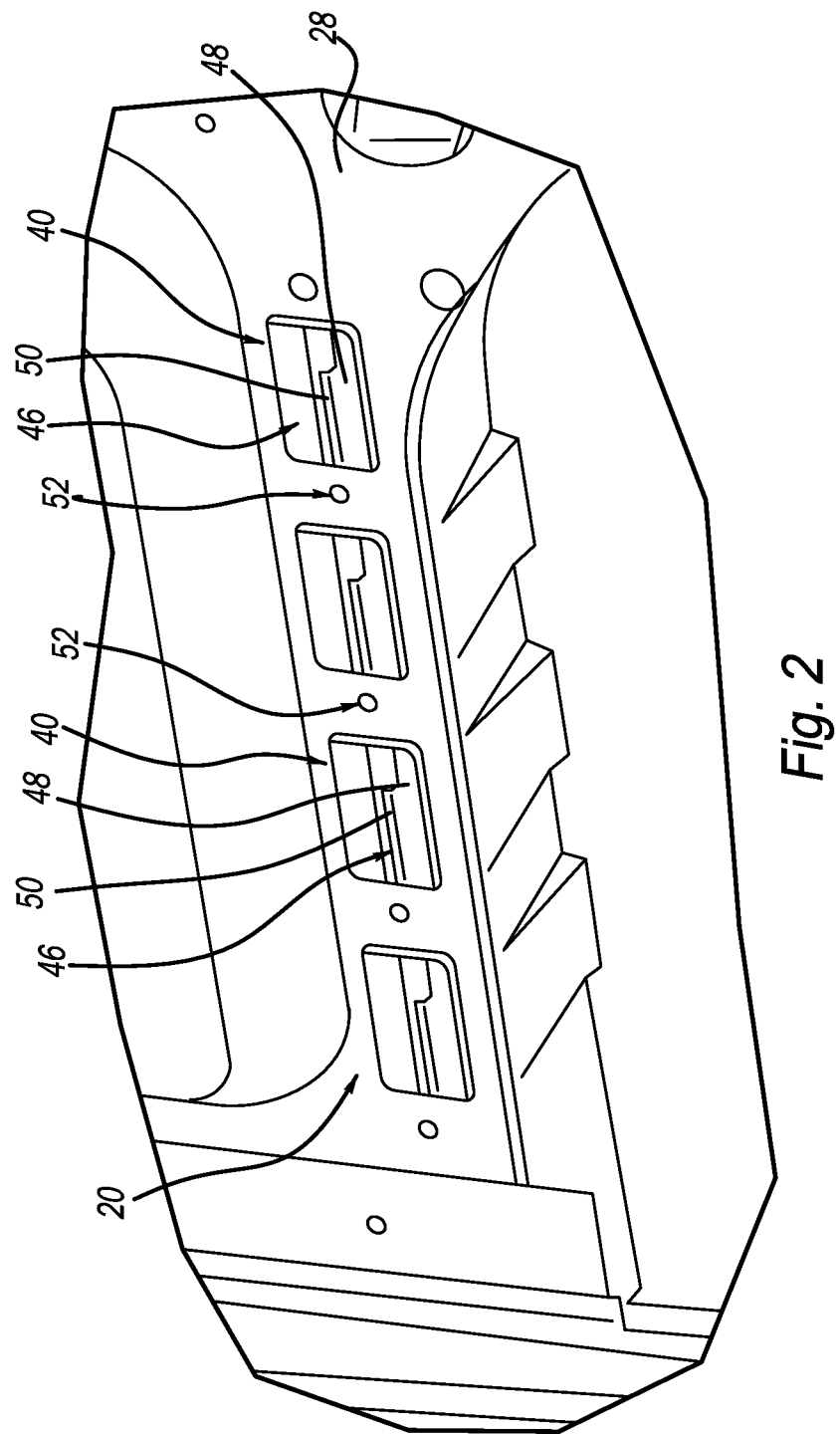
FIG. 2 is a perspective view of first retention features of the cargo management system of FIG. 1.
Figure 3:
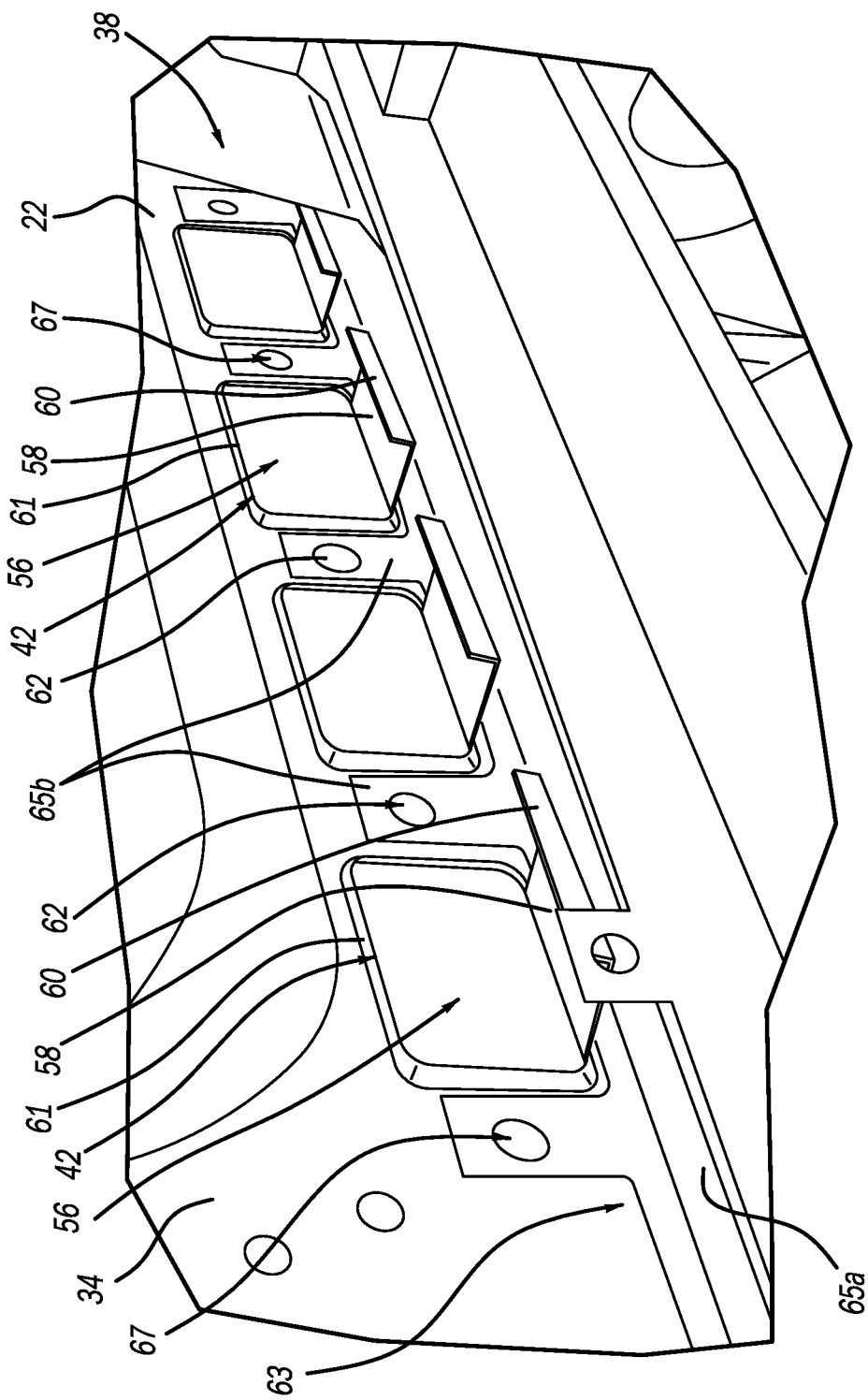
FIG. 3 is a perspective view of second retention features of the cargo management system of FIG. 1.

With additional reference to FIGS. 2 and 3, the cargo management system 16 includes a plurality retention features (i.e., first retention features 40, second retention features 42, third retention features 44, and fourth retention features 47). The first retention features 40 are formed in the inner panel 28 of the first panel structure 20 and are longitudinally aligned with each other along the inner panel 28. Each first retention feature 40 includes an opening or slot 46, a horizontal platform 48, and a lip 50. The opening 46 may be rectangular-shape, for example, and is formed in and extends through the inner panel 28 of the first panel structure 20. In other forms, the opening 46 may be other shapes suitable to receive a plank or beam 51 such as an oval shape, for example. Adjacent openings 46 of the first retention features 40 are spaced apart from each other via the inner panel 28 that includes an aperture 52 formed therein. The aperture 52 receives tie down devices (e.g., bungee cords) that further facilitate the securement of cargo in the cargo area 14.

The platform 48 extends laterally outwardly from a surface defining the opening 46 into the space 32 formed between the inner panel 28 and the outer panel 30 (i.e., a proximal end of the platform 48 extends from the surface of the opening 46 away from the cargo area 14). The platform 48 includes a planar surface. In some forms, the platform 48 is offset to one side of the opening 46 such that a gap between one side of the opening 46 and the platform 48 is greater than a gap between the other side of the opening 46 and the platform 48.

The lip 50 extends upwardly from a distal end of the platform 48 and is located in the space 32 formed between the inner panel 28 and the outer panel 30. The platform 48 and the lip 50 cooperate to form an L-shape and are combined into a unitized part. A flange (not shown) extends laterally outwardly from and substantially around a surface defining a respective opening 46 to improve the stiffness of the inner panel structure 28 surrounding the openings 46.

With reference to FIG. 3, the second retention features 42 are formed in the inner panel 34 of the second panel structure 22 and are longitudinally aligned with each other along the inner panel 34. The second retention features 42 are aligned with respective first retention features 40. Each second retention feature 42 includes an opening or slot 56, a horizontal platform 58, and a lip 60. The opening 56 may be rectangular-shape, for example, and is formed in and extends through the inner panel 34 of the second panel structure 22. In other forms, the opening 56 may be other shapes suitable to receive the plank 51 such as an oval shape, for example. Adjacent openings 56 of the second retention features 42 are spaced apart from each other via the inner panel 34 that includes an aperture 62 formed therein.

The platform 58 extends laterally outwardly from a surface of the opening 56 into the space 38 formed between the inner panel 34 and the outer panel 36 (i.e., a proximal end of the platform 58 extends from the surface defining the opening 56 away from the cargo area 14). The platform 58 includes a planar surface. The lip 60 extends upwardly from a distal end of the platform 58 and is located in the space 38 formed between the inner panel 34 and the outer panel 36. The platform 58 and the lip 60 cooperate to form an L-shape and are combined into a unitized part. A flange 61 extends laterally outwardly from and substantially around a surface defining a respective opening 56 to improve the stiffness of the inner panel 34 surrounding the openings 56. Each of the first and second retention features 40, 42 are manufactured by first cutting a U-shape in the inner panel 28, 34 and subsequently bending the excess material left over from cutting the U-shape in the inner panel 28, 34 to form the platform 48, 58 and the lip 50, 60.

An optional reinforcement member 63 is disposed in the space 38 of the second panel structure 22 and includes a body 65a and a plurality of fingers 65b. The body 65a extends between and is secured to the inner panel 34 and the outer panel 36 and is spaced apart from the platforms 58. The body 65a also extends majority of the length of the panel structure 22. The fingers 65b extend from a lateral side of the body 65a and are secured to (e.g., welded to) the inner panel 34 between the openings 46. Each finger 65b includes an aperture 67 that is aligned with the aperture 62. In this way, the stiffness of the inner panel 34 is improved when tie down devices (e.g., bungee cords) extend through the apertures 62, 67 to further facilitate the securement of cargo in the cargo area 14, for example.

Figure 4A:
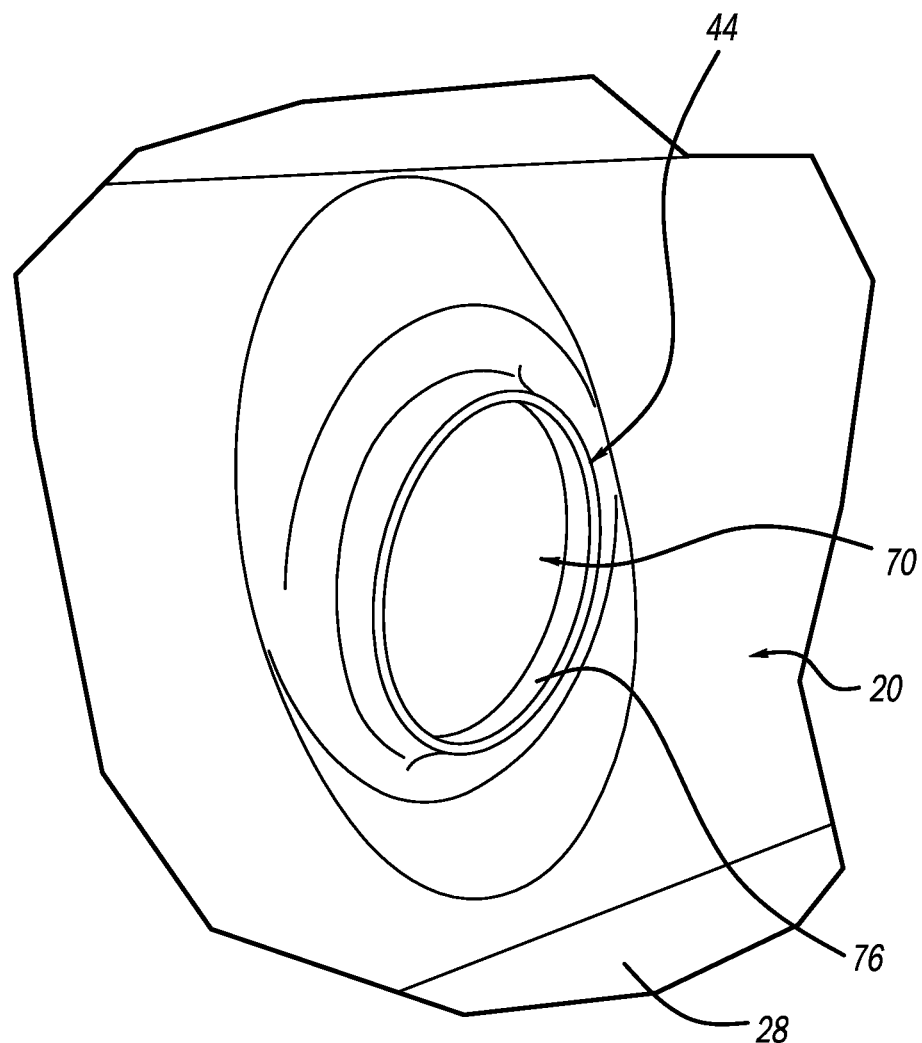
FIG. 4a is a perspective view of a third retention feature of the cargo management system of FIG. 1.
Figure 4B:
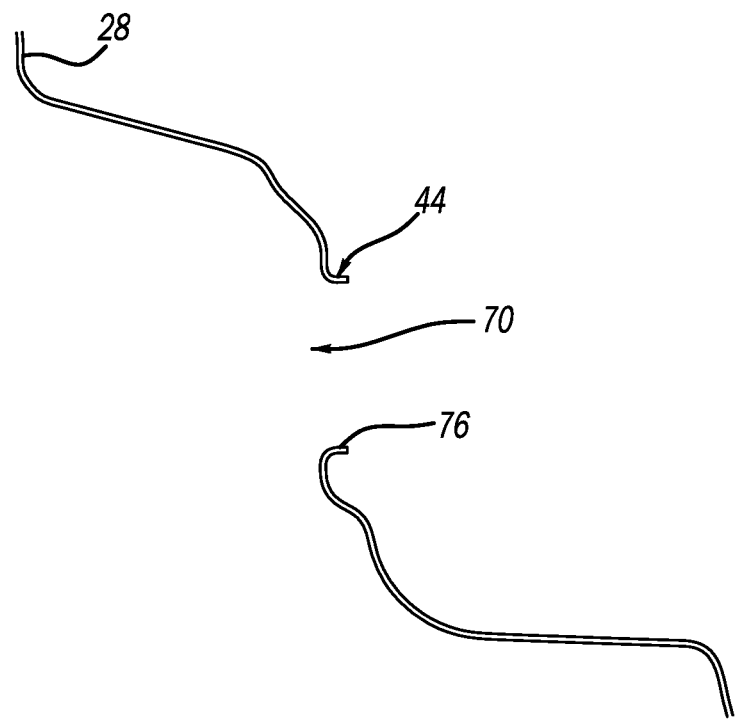
FIG. 4b is a cross-sectional view of the third retention feature of the cargo management system of FIG. 1.

With reference to FIGS. 1, 4a, and 4b, the third retention features 44 are formed in an upper portion of the inner panel 28 of the first panel structure 20 at or near the vehicle roof 26. The third retention features 44 are longitudinally aligned with each other along the inner panel 28. Each third retention feature 44 is adapted to support a first end of a cross rod 71 and includes a circular opening 70 for receiving the first end of the cross rod 71. A circular flange 76 extends laterally outwardly from and substantially around a surface defining a respective opening 70 to improve the stiffness of the inner panel 28 surrounding the opening 70. The flange 76 is located in the space 32 between the inner panel 28 and the outer panel 30.

Figure 5:
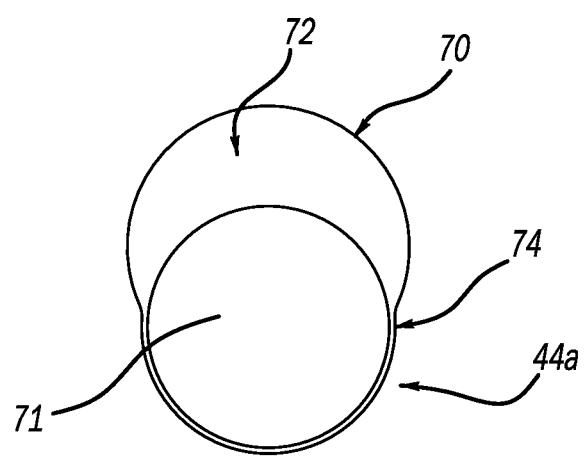
FIG. 5 is a front view of an alternate third retention feature.

In some examples, as shown in FIG. 5, the opening 70 includes an upper portion 72 having a first diameter and a lower portion 74 having a second diameter. The upper portion 72 is located closer toward the vehicle roof 26 and the lower portion 74 is located closer toward the floor. The first diameter is greater than the second diameter and greater than a diameter of the cross rod 71. The first end of the cross rod 71 first extends through the upper portion 72 and then is forced downward into the lower portion 74, thereby securing the first end of the cross rod 71 to the lower portion 74 of the third retention feature 44a (e.g., forming an interference fit between the first end of the cross rod 71 and the lower portion 74). In this way, movement of the cross rod 71 in the longitudinal direction is inhibited. In other forms, the lower portion 74 includes other suitable shapes such as a V-shape with a cross-sectional area less than the upper portion. The first end of the cross rod 71, in some forms, includes a cut-out (not shown) that receives the flange 76 and a portion of the inner panel 28. In this way, movement of the cross rod 70 in the lateral direction is inhibited.

The fourth retention features 47 are formed in an upper portion of the inner panel 34 of the second panel structure 22 at or near the vehicle roof 26. Each fourth retention feature 47 is aligned with a respective third retention feature 44 and is adapted to support an opposed second end of the cross rod 71. The structure and function of the fourth retention features 47 may be similar or identical to the third retention features 44, 44a described above, and therefore, will not be described again in detail. When the cross rod 71 is secured to aligned third and fourth retention features, cargo such as flowers or dry cleaning, for example, may be hung or otherwise supported on the cross rod 71 for delivery to a customer.

Figure 6A:
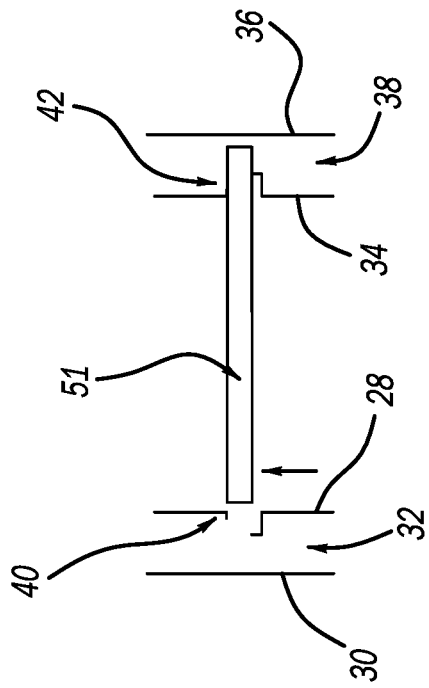
FIGS. 6a-6d are cross-sectional views of a plank being assembled to aligned first and second retention features of the cargo management system of FIG. 1.

With continued reference to FIGS. 6a-6d, a process of assembly and disassembly of the planks 51 to the first and second retention features 40, 42 of the cargo management system 16 may be described in detail. It should be understood that each plank 51 is assembled to a set of aligned first and second retention features 40, 42. First, as shown in FIG. 6a, an assembler (not shown) inserts a first end of the plank 51 into the opening 56 of the second retention feature 42 at an angle such that it extends laterally outwardly past the platform 58 and the lip 60 of the second retention feature 42 and into the space 38 formed between the inner panel 34 and the outer panel 36.

Figure 6B:
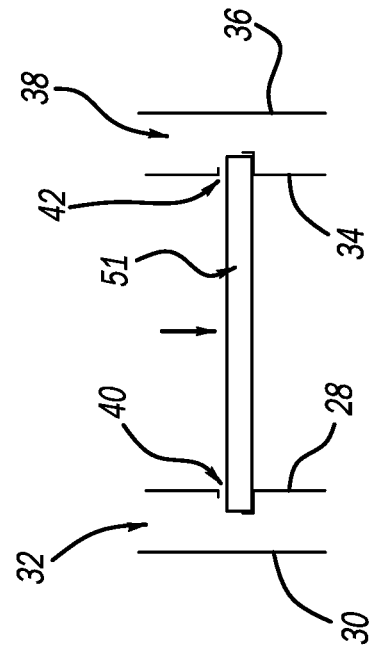
Figure 6C:
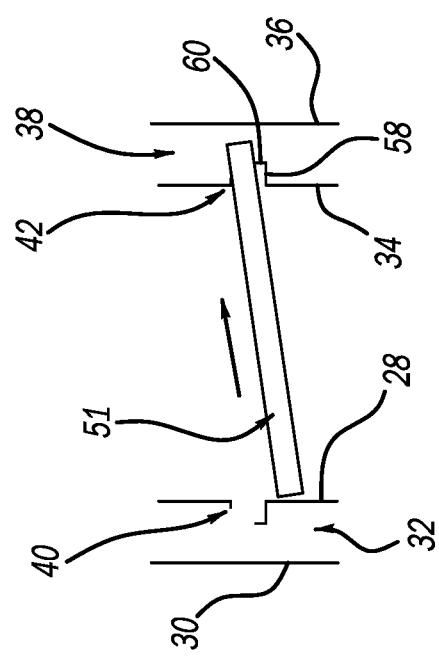
Figure 6D:
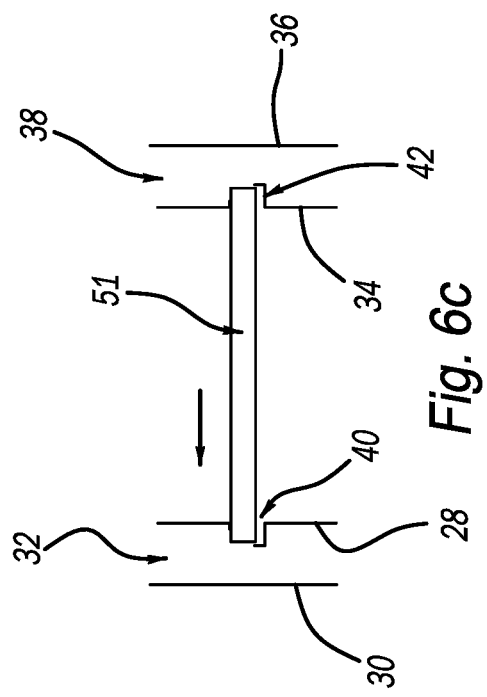

Next, as shown in FIG. 6b, the assembler lifts upwardly on an opposing second end of the plank 51 such that the second end is aligned with the opening 46 of the first retention feature 40 and the first end of the plank 51 rests on the lip 60 of the second retention feature 42. Next, as shown in FIG. 6c, the assembler moves the plank 51 laterally toward the first retention feature 40 until the second end of the plank 51 is inserted through the opening 46 of the first retention feature 40 and between the lips 50, 60 of the first and second retention features 40, 42, respectively (i.e., the plank 51 is not resting on either of the lips 50, 60). The plank 51 is inhibited from moving in a longitudinal direction of the vehicle 10 in response to the plank being inserted through the openings 46, 56 of the first and second retention features 40, 42, respectively Then, as shown in FIG. 6d, the assembler lets go of the plank 51 such that gravity forces the plank 51 downwardly onto the platforms 48, 58 of the first and second retention features 40, 42, respectively. The plank 51 is inhibited from moving in a lateral direction of the vehicle 10 in response to the plank 51 being located on the platforms 48, 58 and between the lips 50, 60.

It should be understood that disassembly of the plank 51 from the first and second retention features 40, 42 is carried out by following the steps above in the reverse order. Although the process was described with respect to the plank 51 being first inserted into the opening 56 of the second retention feature 42, in some forms, the plank 51 may be first inserted into the opening 46 of the first retention feature 40 while remaining within the scope of the present disclosure.

Figure 7:
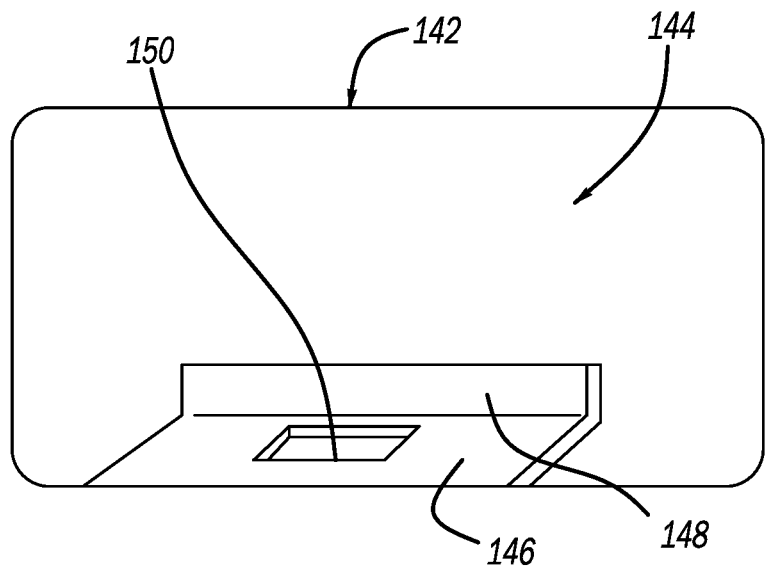
FIG. 7 is a perspective view of another retention feature that can be incorporated into the cargo management system of FIG. 1.

With reference to FIG. 7, another retention feature 142 is illustrated. The retention feature 142 may be incorporated into the cargo management system 16 described above instead of, or in addition to, retention features 40, 42. The structure and function of the retention feature 142 may be similar or identical to retention features 40, 42, apart from any exception noted below.

The retention feature 142 includes an opening or slot 144, a horizontal platform 146, and a lip 148. The platform 146 extends laterally outwardly from a surface defining the opening 144 and includes an elongated slot 150 formed therein. The slot 150 is configured to receive an attachment member (e.g., a hook) coupled to a plank. In this way, the plank is further inhibited from moving in the lateral direction and the longitudinal direction of the vehicle.

Figure 8:
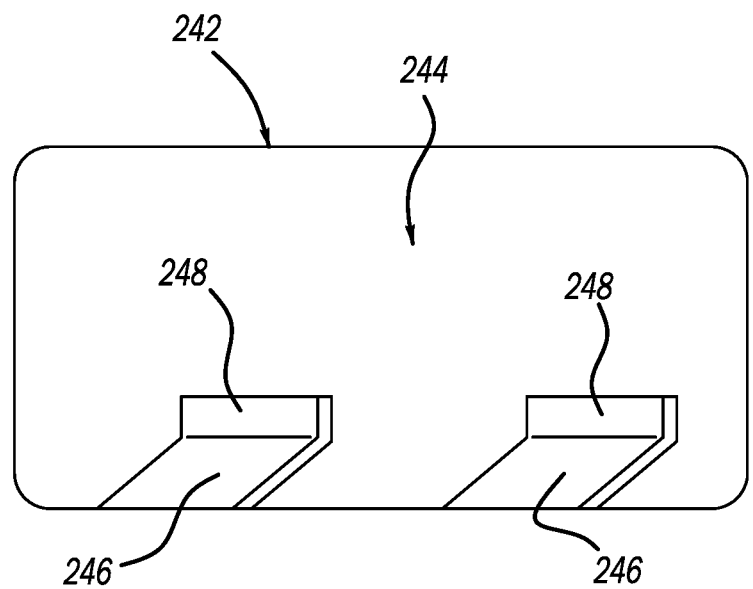
FIG. 8 is a perspective view of yet another retention feature that can be incorporated into the cargo management system of FIG. 1.

With reference to FIG. 8, another retention feature 242 is illustrated. The retention feature 242 may be incorporated into the cargo management system 16 described above instead of, or in addition to, retention features 40, 42, 142. The structure and function of the retention feature 242 may be similar or identical to retention features 40, 42, 142 apart from any exception noted below.

The retention feature 242 includes an opening or slot 244, a plurality of horizontal platforms 246, and a plurality of lips 248. The platforms 246 extend laterally outwardly from a surface defining the opening 244 and are spaced apart from each other. Each lip 248 extends upwardly from a distal end of a respective platform 246. The space between two adjacent platforms 246 is configured to receive an attachment member (e.g., a hook) coupled to a plank. In this way, the plank is further inhibited from moving in the lateral direction and the longitudinal direction of the vehicle.

The cargo management system 16 of the present disclosure allows for sub-compartments to be constructed in the cargo area 14. In some forms, a panel (not shown) is secured to two or more planks 51 to further construct sub-compartments in the cargo area 14. The cargo management system 16 of the present disclosure provides for proper support of the planks 51 and/or the panel and cargo disposed thereon. The cargo management system 16 of the present disclosure also allows for the construction of the sub-compartments in the cargo area 14 without mechanically fastening the planks 51 and/or other materials such as 2×4s to the vehicle body 12 permanently or semi-permanently. In this way, planks 51 and other materials secured to the cargo management system 16 are conveniently assembled and disassembled to support various applications such as flower delivery, dry-cleaning delivery, or animal transport, for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cargo management system for a cargo area of a vehicle, the cargo management system comprising:
    a first retention feature formed in a first panel structure of the cargo area and adapted to support a first end of a support member; and
    a second retention feature formed in an opposing second panel structure of the cargo area, the second retention feature adapted to support an opposed second end of the support member,
    wherein the first and second retention features are configured to inhibit movement of the support member in a longitudinal direction of the vehicle while also allowing the support member to move laterally past one of the first and second retention features into a space defined by a respective panel structure.

2. The cargo management system of claim 1, wherein each of the first and second retention features includes a platform and a lip extending upwardly from a distal end of the platform, and wherein the lips inhibit the support member from moving in a lateral direction of the vehicle when the support member is located on the platforms.

3. The cargo management system of claim 2, wherein the platform and the lip of the first retention feature are positioned between an inner panel of the first panel structure and an outer panel of the first panel structure, and wherein the platform and the lip of the second retention feature are positioned between an inner panel of the second panel structure and an outer panel of the second panel structure.

4. The cargo management system of claim 2, wherein the lip of the first retention feature is positioned between an inner panel of the first panel structure and an outer panel of the first panel structure, and wherein the lip of the second retention feature is positioned between an inner panel of the second panel structure and an outer panel of the second panel structure.

5. The cargo management system of claim 2, wherein the platform and the lip of each of the first and second retention features cooperate to form an L-shape.

6. The cargo management system of claim 2, wherein the platform and the lip of each of the first and second retention features are combined into a unitized part.

7. The cargo management system of claim 2, wherein the platform of the first retention feature extends laterally outwardly from an inner panel of the first panel structure and the platform of the second retention feature extends laterally outwardly from an inner panel of the second panel structure.

8. The cargo management system of claim 1, further comprising:
    a third retention feature formed in the first panel structure and adapted to support a first end of a cross rod, the third retention feature including a circular opening having an upper portion and a lower portion, the upper portion has a first diameter that is greater than a second diameter of the lower portion; and a fourth retention feature formed in the second panel structure and aligned with the third retention feature, the fourth retention feature adapted to support an opposed second end of the cross rod and including a circular opening having an upper portion and a lower portion, the upper portion has a third diameter that is greater than a fourth diameter of the lower portion.

9. The cargo management system of claim 8, wherein the third retention feature comprises a flange extending laterally outwardly from a surface defining the circular opening of the third retention feature, and wherein the fourth retention feature comprises a flange extending laterally outwardly from a surface defining the circular opening of the fourth retention feature.

10. The cargo management system of claim 1, wherein the first retention feature includes a first opening formed in an inner panel of the first panel structure and the second retention feature includes a second opening formed in an inner panel of the second panel structure.

11. The cargo management system of claim 10, wherein a flange extends laterally outwardly from and around a surface defining the first opening, and wherein a flange extends laterally outwardly from and around a surface defining the second opening.

12. The cargo management system of claim 10, wherein the first and second openings have a shape that corresponds to a shape of the support member.

13. The cargo management system of claim 1, wherein each of the first and second retention features includes:
a plurality of platforms spaced apart from each other; and
a plurality of lips, each lip extending upwardly from a distal end of a respective platform.

14. The cargo management system of claim 1, wherein each of the first and second retention features includes:
a planar platform having a slot formed therein; and
a lip extending upwardly from a distal end of the platform, wherein the lips inhibit the support member from moving in a lateral direction of the vehicle when the support member is located on the platforms.

15. A cargo management system for a cargo area of a vehicle, the cargo management system comprising:
a plurality of first retention features formed in a first panel structure of the cargo area; and
a plurality of second retention features formed in an opposing second panel structure of the cargo area and aligned with respective first retention features,
wherein a set of aligned first and second retention features are configured to inhibit movement of a support member in a longitudinal direction of the vehicle while also allowing the support member to move laterally past one of the set of aligned first and second retention features into a space defined by a respective panel structure, and
wherein each of the first and second retention features includes a planar platform and a lip extending upwardly from a distal end of the planar platform.

16. The cargo management system of claim 15, wherein the first retention features are longitudinally aligned along the first panel structure and the second retention features are longitudinally aligned along the second panel structure.

17. The cargo management system of claim 15, wherein the lip of each first retention feature is positioned between an inner panel of the first panel structure and an outer panel of the first panel structure, and wherein the lip of each second retention feature is positioned between an inner panel of the second panel structure and an outer panel of the second panel structure.

18. The cargo management system of claim 15, wherein the platform and the lip of each of the first and second retention features cooperate to form an L-shape.

19. The cargo management system of claim 15, further comprising:
a third retention feature formed in the first panel structure and adapted to support a first end of a cross rod, the third retention feature including a circular opening having an upper portion and a lower portion, the upper portion has a first diameter that is greater than a second diameter of the lower portion; and
a fourth retention feature formed in the second panel structure and aligned with the third retention feature, the fourth retention feature adapted to support an opposed second end of the cross rod and including a circular opening having an upper portion and a lower portion, the upper portion has a third diameter that is greater than a fourth diameter of the lower portion.

20. A cargo management system for a cargo area of a vehicle, the cargo management system comprising:
a first panel structure;
an opposed second panel structure;
a first retention feature formed in the first panel structure and adapted to support a first end of a support member; and
a second retention feature formed in the opposing second panel structure and aligned with the first retention feature, the second retention feature adapted to support an opposed second end of the support member,
wherein the first and second retention features are configured to inhibit movement of the support member in a longitudinal direction of the vehicle while also allowing the support member to move laterally past one of the first and second retention features into a space defined by a respective panel structure, and
wherein each of the first and second retention features includes a planar platform and a lip extending upwardly from a distal end of the planar platform.

* * * * *